US012590114B2

(12) United States Patent
Pietarinen et al.

(10) Patent No.:     US 12,590,114 B2
(45) Date of Patent:     Mar. 31, 2026

(54) METHOD OF MAKING A BINDER COMPOSITION, AND BINDER COMPOSITION

(71) Applicant: UPM-KYMMENE CORPORATION, Helsinki (FI)

(72) Inventors: Suvi Pietarinen, Lappeenranta (FI); Sanna Valkonen, Lappeenranta (FI); Okko Ringena, Neusass (DE)

(73) Assignee: UPM-KYMMENE CORPORATION, Helsinki (FI)

( * ) Notice: Subject to any disclaimer, the term of this patent is extended or adjusted under 35 U.S.C. 154(b) by 14 days.

(21) Appl. No.: 18/216,422

(22) Filed: Jun. 29, 2023

(65) Prior Publication Data

US 2023/0339998 A1      Oct. 26, 2023

Related U.S. Application Data

(60) Continuation of application No. 16/599,237, filed on Oct. 11, 2019, now Pat. No. 11,891,410, which is a division of application No. 15/027,178, filed as application No. PCT/FI2014/050901 on Nov. 25, 2014, now Pat. No. 10,487,101.

(30) Foreign Application Priority Data

Nov. 26, 2013     (FI) ..................................... 20136177

(51) Int. Cl.
C07G 1/00          (2011.01)
C08H 7/00          (2011.01)
C09J 197/00        (2006.01)

(52) U.S. Cl.
CPC ................. *C07G 1/00* (2013.01); *C08H 6/00* (2013.01); *C09J 197/005* (2013.01)

(58) Field of Classification Search
CPC ................................... C07G 1/00; C08H 6/00
See application file for complete search history.

(56) References Cited

U.S. PATENT DOCUMENTS

| | | | |
|---|---|---|---|
| 3,210,240 A | 10/1965 | Read |
| 3,227,667 A | 1/1966 | Moffitt |

(Continued)

FOREIGN PATENT DOCUMENTS

| | | |
|---|---|---|
| CA | 1062827 A | 9/1979 |
| CA | 1068426 A | 12/1979 |

(Continued)

OTHER PUBLICATIONS

Arunjunaj Raj Mahendran et al., "Thermal Characterization of Kraft Lignin Phenol-Formaldehyde Resin for Paper Impregnation," Wood Adhesives, pp. 291-303 (2010).

(Continued)

*Primary Examiner* — Liam J Heincer
(74) *Attorney, Agent, or Firm* — Nixon Peabody LLP

(57) ABSTRACT

The invention relates to a method for treating lignin, wherein the method comprises the following steps: a) dissolving lignin into an aqueous composition, which contains a compound selected from the class of phenols, while keeping the temperature of the composition at 0-60° C.; and b) allowing the composition to react while keeping the temperature of the composition at 60-100° C. and the pH of the composition at a pH value of 6-14. The invention relates further to a method for producing a binder composition and to different applications thereof.

31 Claims, 2 Drawing Sheets

(56) References Cited

U.S. PATENT DOCUMENTS

| | | | |
|---|---|---|---|
| 4,017,430 | A | 4/1977 | Briggs |
| 4,113,675 | A | 9/1978 | Clarke |
| 4,184,914 | A | 1/1980 | Jenkins |
| 4,303,562 | A | 12/1981 | Hollis, Jr. |
| 4,306,999 | A | 12/1981 | Adams |
| 4,476,193 | A | 10/1984 | Seidel |
| 4,597,831 | A | 7/1986 | Anderson |
| 5,010,156 | A | 4/1991 | Cook |
| 6,103,060 | A | 8/2000 | Munerelle |
| 6,632,912 | B2 | 10/2003 | Sudan |
| 10,301,437 | B2 | 5/2019 | Pietarinen |
| 2011/0245381 | A1 | 10/2011 | Winterowd |
| 2016/0257791 | A1 | 9/2016 | Pietarinen |

FOREIGN PATENT DOCUMENTS

| | | | |
|---|---|---|---|
| CA | 1084829 | A | 9/1980 |
| CA | 1117693 | A | 2/1982 |
| CA | 1150441 | A | 7/1983 |
| CA | 2108176 | A1 | 10/1992 |
| CA | 2158636 | A1 | 11/1992 |
| CA | 2081495 | A1 | 7/1993 |
| CA | 2133740 | A1 | 10/1993 |
| CA | 2137778 | A1 | 1/1994 |
| CA | 2159711 | A1 | 10/1994 |
| CA | 2277285 | A1 | 7/1998 |
| CA | 2277286 | A1 | 7/1998 |
| CA | 2335253 | A1 | 12/1998 |
| CA | 2042476 | C | 8/1999 |
| CA | 2439362 | A1 | 9/2002 |
| CA | 2355808 | A1 | 2/2003 |
| CA | 2399171 | A1 | 2/2003 |
| CA | 2458159 | A1 | 7/2005 |
| CA | 2526420 | A1 | 12/2005 |
| CA | 2824446 | A1 | 8/2011 |
| CA | 2832108 | A1 | 10/2012 |
| CA | 2848056 | A1 | 3/2013 |
| CA | 2856145 | A1 | 10/2013 |
| CA | 2867744 | A1 | 10/2013 |
| CA | 2867912 | A1 | 10/2013 |
| CA | 2872333 | A1 | 12/2013 |
| CA | 2924977 | A1 | 4/2015 |
| CA | 2925661 | A1 | 4/2015 |
| CA | 2926315 | A1 | 6/2015 |
| CA | 2927313 | A1 | 6/2015 |
| CA | 2933438 | A1 | 6/2015 |
| CA | 2930962 | A1 | 8/2015 |
| CN | 102936323 | A | 2/2013 |
| CN | 104087219 | A | 10/2014 |
| CN | 104245799 | A | 12/2014 |
| EP | 2993201 | A1 | 3/2013 |
| JP | 2003-159703 | A | 6/2003 |
| JP | 2004-210816 | A | 7/2004 |
| JP | 2005-060590 | A | 3/2005 |
| JP | 2014-133817 | A | 7/2014 |
| WO | 2006031175 | A1 | 3/2006 |
| WO | WO 2012/106808 | A1 | 8/2012 |
| WO | 2012136894 | A1 | 10/2012 |
| WO | WO 2013/144454 | A1 | 3/2013 |
| WO | 2015044528 | A1 | 4/2015 |
| WO | 2015079107 | A1 | 6/2015 |

OTHER PUBLICATIONS

Canadian Intellectual Property Office, Examination Search Report for Canadian Application No. 2926315, mailed Jun. 8, 2017 (3 pages).

English translation of Notice of Reasons for Rejection in Japanese Application No. 2016-53420, mailed Oct. 2, 2018 (4 pages).

Yanyan Chen, "Preparation of Phenol-Lignin by Phenolating Enzymolyzed Lignin and Property Study," a dissertation for master degree of South China Technical University, published on Dec. 15, 2011.

English translation of Chinese Office Action dated Feb. 23, 2017, from Application No. 201480064468.5.

Granata et al., "2-Chloro-4,4,5,5,-tertramethyl-1,3,2-dioxaphospholane, a reagent for the accurate determination of the uncondensed and condensed phenolic moieties in lignins," J. Agric. Food Chem, 1995, 43: 1538-1544 (1995).

Malterud et al., "C-Methylated Dihydropchalcones from Myrica gale L: Effects as Antioxidants and as Scavengers of 1,1-Diphenyl-2-Picrylhydrazyl," Pharmacol. Toxicol., 78: 111-116 (1996).

Arunjunaj Raj Mahendran et al., "Thermal Characterization of Kraft Lignin Phenol-Formaldehyde Resin for Paper Impregnation," Journal of Adhesion Science and Technology 24 (2010) 1553-1565.

M. N. Mohamad Ibrahim, et al., "Formulation of Lignin Phenol Formaldehyde Resins as a Wood Adhesive," The Malaysian Journal of Analytical Sciences, vol. 11, No. 1 (2007) 213-218.

Sukhbaatar et al. "Use of lignin separated from bio-oil in oriented strand board binder phenol-formaldehyde resins." BioResources 4.2 (2009).

Mansouri et al. "Lignin-based polycondensation resins for wood adhesives." Journal of Applied Polymer Science 103.3 (2007): 1690-1699.

Çetin et al. "Studies on lignin-based adhesives for particleboard panels." Turkish Journal of Agriculture and Forestry 27.3 (2003): 183-189.

METHOD OF MAKING A BINDER COMPOSITION, AND BINDER COMPOSITION

CROSS-REFERENCE TO RELATED APPLICATIONS

This application is a continuation of U.S. application Ser. No. 16/599,237, filed Oct. 11, 2019, which is a divisional of U.S. application Ser. No. 15/027,178, filed Apr. 4, 2016, now U.S. Pat. No. 10,487,101, issued on Nov. 26, 2019, which is a 35 U.S.C. § 371 National Phase Entry Application of International Application No. PCT/FI2014/050901, filed Nov. 25, 2014, which designated the U.S., and which claims benefit of FI application No. 20136177, filed Nov. 26, 2013, the contents of each of which are incorporated herein by reference in their entireties.

FIELD OF THE INVENTION

The invention relates to a method for treating lignin and to the use thereof for producing a binder composition as well as to different applications thereof.

BACKGROUND OF THE INVENTION

Lignin is a natural polymer, which can be extracted from e.g. wood. As lignin is a natural biopolymer its use as a component in glues instead of synthetic materials has been investigated in order to come up with a more environmentally friendly adhesive composition. Especially, the ability to replace synthetic phenol in phenolic resins, such as phenol formaldehyde resin, has been the object of prior art. Lignin can be used for the purpose of decreasing the amount of synthetic phenol in a resin composition. Lignin has previously been used for replacing phenol during the production of lignin-phenol-formaldehyde resin.

The currently known lignin based resins are not, however, suitable for all the applications where traditional phenolic resins are being used. For example, the currently known lignin based resins are not suitable for high-pressure laminates. High-pressure laminates (HPL), which are also known as plastic laminates, can be produced by fusing together under the influence of heat and pressure, multiple layers of paper, fabrics, or other core materials by using thermosetting resins as binders. The inventors have recognized a need for a method, which would result in a higher phenol replacement in the resin and thus in a more environmentally friendly binder composition having suitable properties for use in different applications such as high-pressure laminates.

PURPOSE OF THE INVENTION

The purpose of the invention is to provide a new type of method for treating lignin and to provide a method for producing a binder composition for different applications. The purpose of the invention is to provide a new binder composition and adhesive composition as well as the uses thereof.

SUMMARY

A method for producing a binder composition according to one embodiment includes mixing lignin with water, an alkali, and a compound selected from a class of phenols to form a first composition. The method further includes allowing the lignin to react in the first composition and adding a crosslinking agent to the first composition to form a second composition. A concentration of the lignin in the first composition is 10-40 weight-% based on a total weight of the first composition. A concentration of the alkali in the first composition is 0.1-15 weight-% based on the total weight of the first composition.

A binder composition according to one embodiment includes a first part including lignin, water, an alkali, and a compound selected from a class of phenols. The binder composition further includes a second part reacted with the first part. The second part includes a crosslinking agent. A concentration of the lignin in the first part is 10-40 weight-% based on a total weight of the first part. A concentration of the alkali in the first part is 0.1-15 weight-% based on the total weight of the first part.

A method for producing a binder composition according to one embodiment includes mixing lignin with water, an alkali, and a compound selected from a class of phenols to form a first composition. The method further includes allowing the lignin to react in the first composition and adding a crosslinking agent to the first composition to form a second composition. A weight ratio of the lignin to the alkali in the first composition is from 40:60 to 99.8:0.2.

A binder composition formed from an aqueous composition according to one embodiment includes lignin, an alkali, a crosslinking agent, a compound selected from a class of phenols, and water. A weight ratio of the lignin to the alkali in the aqueous composition is from 40:60 to 99.8:0.2.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
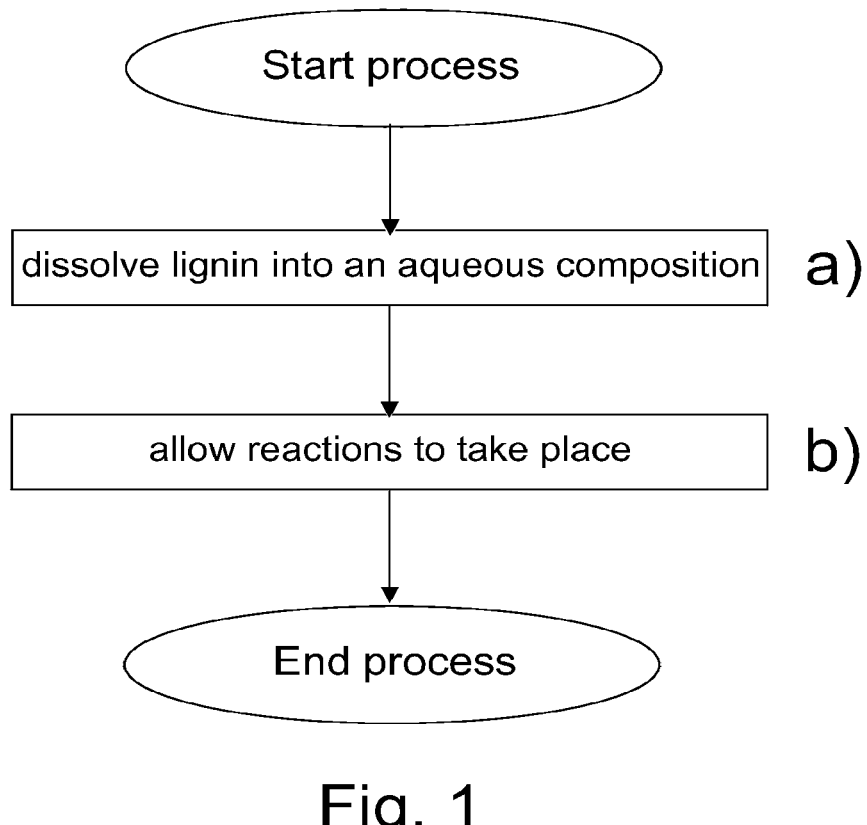
FIG. 1 is a flow chart illustration of a method for treating lignin according to one embodiment of the present invention.

The present invention relates to a method for treating lignin, which method comprises the following steps:
  a) dissolving lignin into an aqueous composition, which contains a compound selected from the class of phenols, while keeping the temperature of the composition at 0-60° C.; and
  b) allowing the composition to react while keeping the temperature of the composition at 60-100° C. and the pH of the composition at a pH value of 6-14.

The present invention further relates to a method for producing a binder composition, wherein the method comprises the following steps:
  a) dissolving lignin into an aqueous composition, which contains a compound selected from the class of phenols, while keeping the temperature of the composition at 0-60° C.;
  b) allowing the composition to react while keeping the temperature of the composition at 60-100° C. and the pH of the composition at a pH value of 6-14; and
  c) mixing the composition formed in step b) with a crosslinking agent and heating the composition at a temperature of 60-100° C. while, keeping the pH of the composition at a pH value of 6-14.

In one embodiment of the present invention lignin is dissolved into a composition, which consists of water and at least one compound selected from the class of phenols, in step a). In one embodiment of the present invention lignin is dissolved into an aqueous composition of a compound selected from the class of phenols.

In one embodiment of the present invention the compound selected from the class of phenols is selected from a group consisting of phenol, cresol, resorcinol and combinations thereof. In one embodiment of the present invention the compound selected from the class of phenols is phenol.

In one embodiment of the present invention the alkali is added to the composition in step a). In one embodiment of the present invention alkali is added to the composition in step b). In one embodiment of the present invention alkali is added to the composition in step a) and in step b).

In one embodiment of the present invention the alkali comprises a hydroxide of an alkali metal.

Step b) comprises allowing the composition to react, i.e. step b) comprises allowing reactions to take place in the composition. In one embodiment of the present invention step b) comprises allowing the composition to react with alkali, wherein the alkali comprises a hydroxide of an alkali metal.

The inventors of the present invention surprisingly found out that dissolving lignin into a composition of e.g. phenol and water, without allowing the lignin to actually react with the phenol due to the specific temperature used, advantageously affects the step of producing a binder composition and enables the production of a binder composition with a low pH value if desired. Without limiting the invention to any specific theory of why the above advantage can be achieved, it is to be considered that when lignin is dissolved into a composition of e.g. phenol and water, no covalent bonds are formed, but the reactive sites of both lignin and phenol are present in a sterically beneficial position with regard to the further reactions taking place during the production of the binder composition. The inventors of the present invention found out that by the method of the present invention it was possible to produce a lignin based binder composition that is suitable for e.g. the production of high-pressure laminates.

In one embodiment of the present invention lignin is allowed to react with the compound selected from the class of phenols in step b) by adjusting the temperature and the pH to a suitable level.

In one embodiment of the present invention step b) is carried out for alkalating the lignin. The alkalation step results in the lignin being activated. Without limiting the invention to any specific theory about why alkalation of lignin results in a more activated or more reactive lignin being formed compared to non-alkalated lignin, it is to be considered that the alkalation opens the macromolecular structure of lignin whereby the steric hindrances that usually disable reactive groups in lignin structures are removed. Alkalation may also add charged groups to the lignin macromolecule. In one embodiment of the present invention treating lignin with the method according to the present invention activates the lignin. The advantage of using alkalated e.g. for producing a binder composition is that the compatibility and reaction behavior is much better than in a normal case, where non-treated lignin has been used in the cooking or polymerizing stage of production process.

The inventors surprisingly found out that when dissolving lignin into phenol, the phenol is sterically close to the reactive sites of the lignin. When these reactant components are allowed to react in step c) of the method according to the present invention with a crosslinking agent, e.g. formaldehyde, the used crosslinking agent will react equally with both components allowing the formation of a binder composition having a high ratio of bio-based materials.

In this specification, unless otherwise stated, the expression "lignin" should be understood as lignin originating from any suitable lignin source.

The lignin used can be essentially pure lignin. By the expression "essentially pure lignin" should be understood as at least 90% pure lignin, preferably at least 95% pure lignin. In one embodiment of the present invention the essentially pure lignin comprises at most 10%, preferably at most 5%, of other components. Extractives and carbohydrates such as hemicelluloses can be mentioned as examples of such other components. In one embodiment of the present invention the lignin contains less than 10 weight-%, preferably less than 6 weight-%, and more preferably less than 4 weight-% of carbohydrates. The amount of carbohydrates present in lignin can be measured by high performance anion exchange chromatography with pulsed amperometric detector (HPAE-PAD) in accordance with standard SCAN-CM 71.

In one embodiment of the present invention the ash percentage of lignin is less than 7.5 weight-%, preferably less than 5 weight-%, and more preferably less than 3 weight-%. The ash content can be determined by carbonifying and quickly burning a lignin sample so that alkali salts are not melted before the organic matter has been burned (e.g. 20-200° C. for 30 minutes, after which temperature is adjusted to 200-600° C. for 1 h, and thereafter adjusting the temperature to 600-700° C. for 1 hour), and finally the lignin sample is ignited at 700° C. for 1 h. Ash content of a lignin sample refers to the mass that remains of the sample after burning and ignition, and it is presented as percent of the sample's dry content.

In one embodiment of the present invention the weight average molecular weight (Mw) of lignin is 1000-15000 g/mol, preferably 2000-10000 g/mol, and more preferably 3000-8000 g/mol. The molecular weight of the lignin can be determined by using a high-performance size-exclusion chromatography in the following manner: Two parallel measurements are carried out. 0.1 M NaOH is used as an eluent. Calibration is done using Na-polystyrene sulfonate standards having a molecular weight of 1100-73900 g/mol. For quality control, standard quality kraft lignin and PSS molecular weight standard are used. The columns used are PSS MCX precolumns, 1000 Å and 100 000 Å separation columns filled with sulfonated styrene-divinylbenzene copolymer matrix. Isocratic run program is used. The run time is 45 minutes. The injection volume is 50 µl. The flux is 0.5 ml per minute. The temperature is 25° C. As a result of the chromatography, number average molecular weight (Mn), weight average molecular weight (Mw), peak molecular weight (Mp) and polydispersity index (PDI) values can be reported.

In one embodiment of the present invention the number average molecular weight (Mn) of lignin is 700-4000, preferably 800-3000, and more preferably 1000-2500.

In one embodiment of the present invention the polydispersity of lignin is 1.0-7, preferably 1.2-6, and more preferably 1.4-4.5.

In one embodiment of the present invention the normalized radical scavenger index (NRSI) of lignin is 0.01-20, preferably 0.05-10, and more preferably 0.1-6. The antioxidant activity of extracts can be evaluated using DPPH-method in methanol extracts.

The basis of the radical scavenging method is described in Malterud et al. (Pharmacol. Toxicol. 1996, 78: 111-116). The method is based on the ability of extracts and pure components to react with 1,1,-diphenylpicryl-2-hydrazylradical (DPPH·)-molecules when DPPH loses its radical characteristic. The decline of radical form can be observed with spectrophotometer as a change of solution color from violet to yellow (absorbance is measured at wavelength 515 nm). RSI (radical scavenging index) is defined as the inverse of the concentration that produced 50% inhibition in DPPH absorbance at 515 nm. The results can then be "normalized" (NRSI) by dividing the sample RSI by the RSI value for the butyl hydroxytoluene (BHT) control.

In one embodiment of the present invention the dry solids content of lignin is below 98%, preferably 40-80%, and more preferably 50-70%. The dry solids content can be measured by drying a lignin sample of 1-5 g at a temperature of 60° C. or above in a vacuum oven for four hours.

In one embodiment of the present invention the lignin has an amount of 0.1-6 mmol, preferably 0.3-3.5 mmol of aliphatic hydroxyl groups per gram of dry lignin.

In one embodiment of the present invention the lignin has an amount of 0.1-5 mmol, preferably 1.5-4.5 mmol of phenolic hydroxyl groups per gram of dry lignin. Aliphatic and phenolic hydroxyl groups can be determined by characterizing a lignin sample with 31P NMR spectroscopy after phosphitylation and after which the aliphatic hydroxyl groups can be quantitatively determined. For 31P NMR analyzes 40 mg of lignin can be weighted and dissolved in 300 μl of N,N-dimethylformamide. After total dissolution 200 μl of pyridine, 400 μl (0.05M) of internal standard solution (ISTD) of Endo-N-Hydroxy-5-norbornene-2,3-dicarboximide in pyridine/CDCl₃ and 100 μl of Cr(acac)₃ solution in pyridine/CDCl₃ is added. Then 200 μl of phosphitylation reagent 2-chloro-4,4,5,5-tetramethyl-1,3,2-dioxaphopholane is added drop-wise. Finally 600 μl of CDCl₃ is added to the solution and clear brown to black solution is achieved. Freshly prepared samples can then be measured with 31P NMR at room temperature. Bruker 500 MHz NMR spectrometer can be used for the measurement. 31P NMR measurement is based on the method developed by Grannata and Argyropoulos (Grannata A. and Argyropoulos D. S., 2-Chloro-4,4,5,5-tetramethyl-dioxaphospholane, a reagent for the accurate determination of the uncondensed and condensed phenolic moieties in lignins. J. Agric. Food Chem, 1995, 43:1538-1544). The results are calculated as mmol/g lignin.

In one embodiment of the present invention the lignin is selected from a group consisting of kraft lignin, steam explosion lignin, biorefinery lignin, supercritical separation lignin, hydrolysis lignin, flash precipitated lignin, biomass originating lignin, lignin from alkaline pulping process, lignin from soda process, lignin from organosolv pulping and combinations thereof. In one embodiment of the present invention the lignin is wood based lignin. The lignin can originate from softwood, hardwood, annual plants or from a combination thereof.

Different lignin components may have different properties, e.g. molecular weight, molar mass, polydispersity, hemicellulose and extractive contents and compositions.

By "kraft lignin" is to be understood in this specification, unless otherwise stated, lignin that originates from kraft black liquor. Black liquor is an alkaline aqueous solution of lignin residues, hemicellulose, and inorganic chemicals used in a kraft pulping process. The black liquor from the pulping process comprises components originating from different softwood and hardwood species in various proportions.

Lignin can be separated from the black liquor by different techniques including e.g. precipitation and filtration. Lignin usually begins precipitating at pH values below 11-12. Different pH values can be used in order to precipitate lignin fractions with different properties. These lignin fractions differ from each other by molecular weight distribution, e.g. Mw and Mn, polydispersity, hemicellulose and extractive contents. The molar mass of lignin precipitated at a higher pH value is higher than the molar mass of lignin precipitated at a lower pH value. Further, the molecular weight distribution of lignin fraction precipitated at a lower pH value is wider than of lignin fraction precipitated at a higher pH value.

The precipitated lignin can be purified from inorganic impurities, hemicellulose and wood extractives using acidic washing steps. Further purification can be achieved by filtration.

In one embodiment of the present invention the lignin is flash precipitated lignin. The term "flash precipitated lignin" should be understood in this specification as lignin that has been precipitated from black liquor in a continuous process by decreasing the pH of a black liquor flow, under the influence of an over pressure of 200-1000 kPa, down to the precipitation level of lignin using a carbon dioxide based acidifying agent, preferably carbon dioxide, and by suddenly releasing the pressure for precipitating lignin. The method for producing flash precipitated lignin is disclosed in patent application FI 20106073. The residence time in the above method is under 300 s. The flash precipitated lignin particles, having a particle diameter of less than 2 μm, form agglomerates, which can be separated from black liquor using e.g. filtration. The advantage of the flash precipitated lignin is its higher reactivity compared to normal kraft lignin. The flash precipitated lignin can be purified and/or activated if needed for the further processing.

In embodiment of the present invention the lignin is separated from pure biomass. The separation process can begin with liquidizing the biomass with strong alkali or strong acid followed by a neutralization process. After the alkali treatment the lignin can be precipitated in a similar manner as presented above. In one embodiment of the present invention the separation of lignin from biomass comprises a step of enzyme treatment. The enzyme treatment modifies the lignin to be extracted from biomass. Lignin separated from pure biomass is sulphur-free and thus valuable in further processing.

In one embodiment of the present invention the lignin is steam explosion lignin. Steam explosion is a pulping and extraction technique that can be applied to wood and other fibrous organic material.

By "biorefinery lignin" is to be understood in this specification, unless otherwise stated, lignin that can be recovered from a refining facility or process where biomass is converted into fuel, chemicals and other materials.

By "supercritical separation lignin" is to be understood in this specification, unless otherwise stated, lignin that can be recovered from biomass using supercritical fluid separation or extraction technique. Supercritical conditions correspond to the temperature and pressure above the critical point for a given substance. In supercritical conditions, distinct liquid and gas phases do not exist. Supercritical water or liquid extraction is a method of decomposing and converting biomass into cellulosic sugar by employing water or liquid under supercritical conditions. The water or liquid, acting as a solvent, extracts sugars from cellulose plant matter and lignin remains as a solid particle.

In one embodiment of the present invention the lignin is hydrolysis lignin. Hydrolysed lignin can be recovered from paper-pulp or wood-chemical processes.

In one embodiment of the present invention the lignin originates from an organosolv process. Organosolv is a pulping technique that uses an organic solvent to solubilize lignin and hemicellulose.

In one embodiment of the present invention the temperature of the composition is kept, in step a), preferably at 15-55° C., more, preferably at 20-50° C., and even more preferably at 30-45° C. Keeping the temperature of the composition in step a) at 0-60° C., and preferably at the above mentioned ranges, allows the lignin to dissolve into the aqueous composition, which contains a compound selected from the class of phenols, while, at least for most part of the lignin, hindering it from reacting with the compound selected from the class of phenols.

The pH value of the composition in step a) and in step b) can be selected depending on the final application of the binder composition to be produced.

In one embodiment of the present invention, the pH of the composition is kept, in step a), at the pH value of 4-10, preferably at the pH value of 4.5-9.5, more preferably at the pH value of 5-9, and even more preferably at the pH value of 5.5-8.5. In one embodiment of the present invention the pH of the composition is kept, in step b), preferably at the pH value of 6-10, more preferably at the pH value of 6.5-9.5, and even more preferably at the pH value of 7-9. These kinds of pH ranges may be used in step a) and in step b) when producing a binder composition for high-pressure laminates.

In one embodiment of the present invention, the pH of the composition is kept, in step a), at the pH value, of 4-14, preferably at the pH value of 7-13.5, and more preferably at the pH value of 8.5-13. In one embodiment of the present invention the pH of the composition is kept, in step b), preferably at the pH value of 7-14, more preferably at the pH value of 9-13.5, and even more preferably at the pH value of 10-13. These kinds of pH ranges may be used in step a) and in step b) when producing a binder composition for plywood.

The composition is treated, in step b), at a temperature of 60-100° C. In one embodiment of the present invention, the composition is heated, in step b), preferably at a temperature of 70-95° C., and more preferably at a temperature of 75-90° C.

In one embodiment of the present invention step b) is carried out for 10 minutes-2 hours, preferably for 1 hour-1.5 hours.

In one embodiment of the present invention the alkali is sodium hydroxide, potassium hydroxide, or a combination thereof.

In one embodiment of the present invention the concentration of alkali is 0.1-11 weight-%, and preferably 0.5-9 weight-% based on the total weight of the composition in step b). In one embodiment of the present invention the concentration of alkali is 0.1-5 weight-%, and preferably 0.5-2 weight-% based on the total weight of the composition in step b). In one embodiment of the present invention the concentration of alkali is 3-15 weight-%, preferably 5-12, and more preferably 6-10 weight-% based on the total weight of the composition in step b).

In one embodiment of the present invention the concentration of lignin in step a) is 10-40 weight-%, and preferably 20-30 weight-% based on the total weight of the composition in step a).

In one embodiment of the present invention the concentration of the compound selected from class of phenols in step a) is 10-50 weight-%, preferably 20-50 weight-%, and more preferably 20-45 weight-% based on the total weight of the composition in step a).

The step of heating the formed composition in step c) is carried out for polymerizing the reactant components, i.e. lignin, the compound selected from the class of phenols, and, the crosslinking agent, such that the viscosity of the binder composition is increased. The heating can be continued until a predetermined viscosity value is formed. The predetermined viscosity value of the final binder composition may vary depending on the specific application where the binder composition is to be used.

In one embodiment of the present invention the predetermined viscosity value of the final binder composition is at least 40 cP, preferably at least 50 cP, and more preferably at least 80 cP. In one embodiment of the present invention the predetermined viscosity value of the final binder composition is at least 40 but not more than 250 cP, preferably at least 50 cP but not more than 150 cP, and more preferably at least 80 but not more than 120 cP.

In one embodiment of the present invention the predetermined viscosity value of the final binder composition is at least 250 cP, preferably at least 300 cP, and more preferably at least 500 cP. In one embodiment of the present in the predetermined viscosity value of the final binder composition is at least 250 cP but not more than 1500 cP, preferably at least 300 cP but not more than 1200 cP, and more preferably at least 500 but not more than 1000 cP.

The viscosity is measured at 25° C. using a rotary viscometer.

In one embodiment of the present invention, step c) comprises heating the composition preferably at a temperature of 65-95° C., more preferably at a temperature of 70-90, and even more preferably at a temperature of 75-85° C.

In one embodiment of the present invention the crosslinking agent is selected from a group consisting of an aldehyde, a derivative of an aldehyde, an aldehyde forming compound and combinations thereof. In one embodiment of the present invention the derivative of an aldehyde is hexamethylenetetramine, paraformaldehyde or trioxane. In one embodiment of the present invention the crosslinking agent is selected from a group consisting of an aromatic aldehyde, glyoxal, furfuryl alcohol, caprolactam and glycol compounds. The aldehyde can be formaldehyde. The aromatic aldehyde can be furfuryl aldehyde. In one embodiment of the present invention the crosslinking agent is an aldehyde, and preferably formaldehyde, paraformaldehyde or a combination thereof.

In one embodiment of the present invention step c) is carried out in the presence of a catalyst. In one embodiment of the present invention the catalyst is selected from a group consisting of sodium hydroxide, potassium hydroxide and any mixture thereof.

In one embodiment of the present invention the pH of the composition is kept, in step c), preferably at the pH value of 6-10, more preferably an the pH value of 6.5-9.5, and even more preferably at the pH value of 7-9.

In one embodiment of the present invention the pH of the composition is kept, in step c), preferably at the pH value 7-14, more preferably at the pH value of 9-13.5, and even more preferably at the pH value of 10-13.

The present invention further relates to the use of lignin treated by the method according to the present invention for the production of a binder composition.

The present invention further relates to a binder composition obtainable by the method according to the present invention.

The present invention further relates to an adhesive composition comprising the binder composition according to the present invention. The adhesive composition can further comprise one or more adhesive components selected from a group consisting of other binders, extenders, additives, catalysts and fillers.

The present invention further relates to the use of a binder composition obtainable by the method according to the present invention, wherein the pH of the composition is kept in step a) at a value of 4-10 and in step b) at a value of 6-10, for producing a laminate, and preferably a high-pressure laminate.

The present invention further relates to the use of a binder composition obtainable by the method according to the present invention, wherein the pH of the composition is kept in step c) at a value of 6-10 for producing a laminate, and preferably high-pressure laminate.

The present invention further relates to the use of a binder composition obtainable by the method according to the present invention, wherein the pH of the composition is kept in step a) at a value of 4-10 and in step b) at a value of 6-10, for producing a foundry material, a protective coating, a friction material, an abrasive material, glass wool, rock wool, a prepreg, a shuttering film, an overlay, a molding component or a fiber reinforced composite.

The present invention further relates to the use of a binder composition obtainable by the method according to the present invention, wherein the pH of the composition is kept in step c) at a value of 6-10, for producing a foundry material, a protective coating, a friction material, an abrasive material, glass wool, rock wool, a prepreg, a shuttering film, an overlay a molding component or a fiber reinforced composite.

The present invention further relates to the use of a binder composition obtainable by the method according to the present invention, wherein the pH of the composition is kept in step a) at a value of 4-14 and in step b) at a value of 7-14, for producing a particle board, an oriented strand board, a chip board, an intrallam, a gluelam, a hardboard, a waferboard, a fiber board, a, plywood, or a wood adhesive.

The present invention further relates to the use of a binder composition obtainable by the method according to the present invention, wherein the pH of the composition is kept, in step c), preferably at the pH value of 7-14, for producing a particle board, an oriented strand board, a chip board, an intrallam, a gluelam, a hardboard, a waferboard, a fiber board, a, plywood, or a wood adhesive.

The embodiments of the invention described hereinbefore may be used in any combination with each other. Several of the embodiments may be combined together to form a further embodiment of the invention. A method, a composition or a use, to which the invention is related, may comprise at least one of the embodiments of the invention described hereinbefore.

An advantage of the method according to the present invention is that it is possible to treat lignin in a manner that enables the production of a low binder composition, i.e. a binder composition with a neutral or acidic pH range. The lignin treated with the method according to the present invention has an open structure making it more reactive whereby the production of low pH binder composition is possible with lignin.

An advantage of the present invention is that a bio-based binder composition suitable to be used for the production of high-pressure laminates can be produced by the method according to the present invention. An advantage of the present invention is that a more environmentally friendly binder composition can be produced for high-pressure laminates.

EXAMPLES

Reference will now be made in detail to the embodiments of the present invention, an example of which is illustrated in the accompanying drawing.

The description below discloses some embodiments of the invention in such a detail that a person skilled in the art is able to utilize the invention based on the disclosure. Not all steps of the embodiments are discussed in detail, as many of the steps will be obvious for the person skilled in the art based on this specification.

FIG. 1 illustrates a method according to one embodiment of the present invention for treating lignin.

Before the treatment of lignin is started, the source of lignin is chosen. Also the other components and their amounts to be used in the method according to the present invention are selected. If needed, the components used in the method of FIG. 1 can be pre-treated to be suitable for the lignin treatment processes.

Following the various preparations and pre-treatments, in one of the embodiments of the present invention shown in FIG. 1, step a) is carried out. Step a) comprises dissolving lignin into an aqueous composition containing a compound selected from the class of phenols. The temperature of the composition is kept at 0-60° C.

After the step of dissolving lignin, the composition formed in step a) is allowed to react while keeping the temperature of the composition at 60-100° C. and the pH of the composition at a pH value of 6-14.

In one embodiment of the present invention, after the step of dissolving lignin, the composition formed in step a) is subjected to an alkali treatment for alkalating the lignin in step b). The alkali can be added to the composition in step a) and/or in step b). The alkali is a hydroxide of an alkali metal.

Step a) and step b) result in the lignin being suitable for further production steps and being suitable for being covalently bonded with e.g. formaldehyde.

Figure 2:
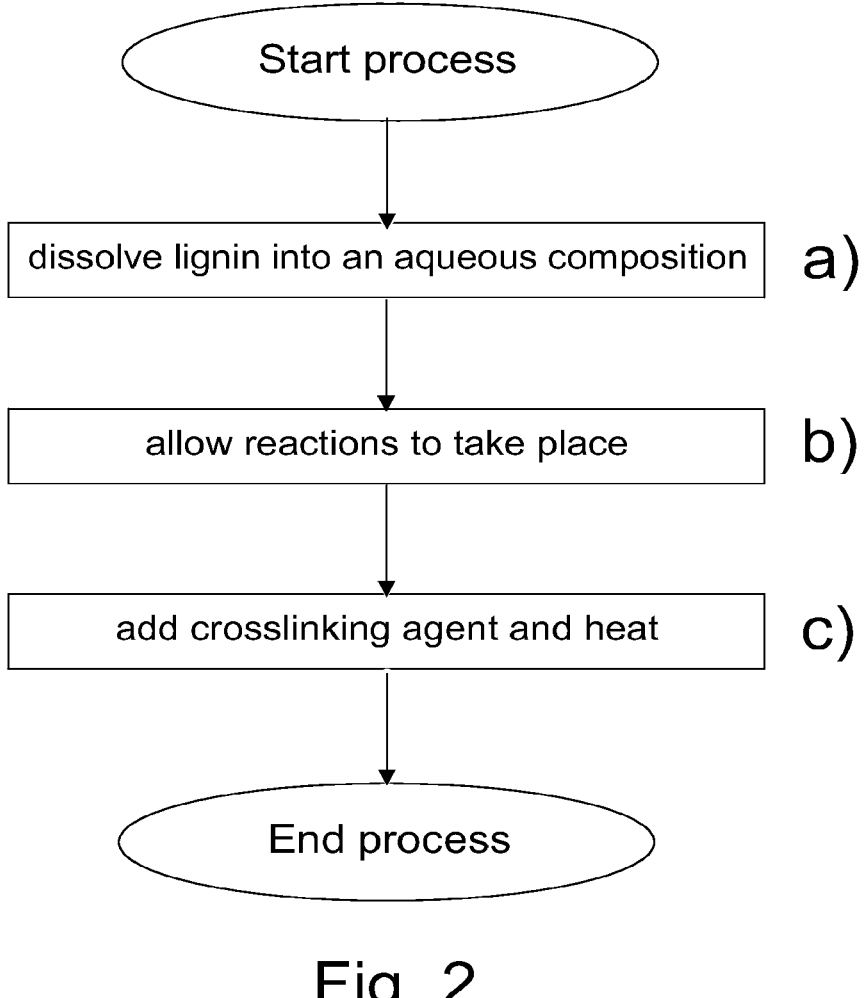
FIG. 2 is a flow chart illustration of a method for producing a binder composition according to one embodiment of the present invention.

FIG. 2 illustrates a method according to one embodiment of the present invention for producing a binder composition.

The method illustrated in FIG. 2 begins with treating lignin in step a) and step b) in accordance with the method described above for FIG. 1.

After step b) the composition formed in step b) is mixed with a crosslinking agent in step c). The formed composition is heated at a temperature, of 60-100° C. for allowing the reactant components, i.e. the lignin, the compound selected from the class of phenols and the crosslinking agent, in the composition to react with each other for forming a binder composition. The pH of the composition is kept in step c) at a pH value of 6-14. The heating of the composition is continued until a desired, predetermined, viscosity value of the binder composition is reached.

As a result of step c) a binder composition having desired properties and especially having high ratio of bio-based components is produced. This binder composition can be used as such for gluing applications or it can be further processed with other adhesive components for producing an adhesive composition.

Example 1

Activating Lignin and the Use of Activated Lignin
for the Production of a Binder Composition In this example lignin was firstly treated with phenol and
sodium hydroxide. The following components and their
amounts were used:

| Material | MW | Concentration | Mass, g |
|----------|-----|--------------|---------|
| NaOH | 40 | 50% | 43.3 |
| Water | 18 | 0% | 529.0 |
| Lignin | 180 | 70% | 509.0 |
| Phenol | 94 | 90% | 594.0 |

Firstly a composition of water and phenol was formed.
Then lignin was slowly added to the composition with
agitation while keeping the temperature of the composition
below 30° C. and the pH of the composition be a value of
8. When all of the lignin had been added, sodium hydroxide
was added to the composition while heating the composition
up to a temperature of 90° C. The pH of the composition was
kept at a value of below 9. The heating of the composition
was continued for 10 minutes at the temperature of 90° C.

Lignin treated as above described was thereafter used for
producing a binder composition. 438 g of paraformaldehyde
was added to the above formed composition in a stepwise
manner. Thereafter the pH of the composition was measured
to have a value of 7.70. The formed composition was heated
at a temperature of about 80° C. and the heating was
continued for 2 hours and 15 minutes, during which time the
viscosity increased to 130 cP as measured at 25° C. using a
rotary viscometer.

The formed binder composition was thereafter analyzed.
The results of the analysis can be seen in Table 1.

TABLE 1

| Analysis results | |
|------------------|---|
| Specifications | |
| MR | 1.9 |
| Solids (2 g, 2 h at 120° C.), % | 54.7 |
| Viscosity, cP | 125 |
| pH | 8.05 |
| WT | >1/9 |
| Gel time 100° C., min | 61 |

In Table 1 MR stands for molecular ratio, i.e. the ratio of
mol(paraformaldehyde)/mol(phenol+lignin). In Table 1 WT
stands for water tolerance, i.e. describes how much water
can be added to resin before resin starts to precipitate.

The gel time was determined by adding 0.5 ml of the
sample in a test tube with a rod. The sample was not to be
stirred. The test tube was heated to 100° C. in a glycerin or
oil bath without mixing. The time until the sample became
pasty (melted solid) was measured after which the measure-
ment was completed.

From the results indicated in Table 1 it can be seen that the
solids content is on a suitable level for the binder compo-
sition to be used for high-pressure laminates. The water
tolerance is better than for traditionally used phenol-form-
aldehyde binder compositions used for laminates.

Example 2

Activating Lignin and the Use of Activated Lignin
for the Production of a Binder Composition In this example lignin was firstly treated with phenol and
sodium hydroxide. The following components and their
amounts were used:

| Material | MW | Concentration | Mass, g |
|----------|-----|--------------|---------|
| NaOH | 40 | 50% | 48.0 |
| Water | 18 | 0% | 537.0 |
| Lignin | 180 | 70% | 650.0 |
| Phenol | 94 | 90% | 506.0 |

Firstly a composition of water and phenol was formed.
Then lignin was slowly added to the composition with
agitation while keeping the temperature of the composition
below 30° C. and the pH of the composition below a value
of 5. When all of the lignin had been added, sodium
hydroxide was added to the composition while heating the
composition up to a temperature of 90° C. The pH of the
composition was kept at a value of below 9. The heating of
the composition was continued for 10 minutes at the tem-
perature of 90° C.

Lignin treated as above described was thereafter used for
producing a binder composition. 421 g of paraformaldehyde
was added to the above formed composition in a stepwise
manner. Thereafter the pH was measured to have a value of
7.70. The formed composition was heated at a temperature
of about 78° C. and the heating was continued for 1 hours
and 23 minutes, during which time the viscosity increased to
130 cP as measured at 25° C. using a rotary viscometer.

The formed binder composition was thereafter analyzed.
The results of the analysis can be seen in Table 2.

TABLE 2

| Analysis results | |
|------------------|---|
| Specifications | |
| MR | 1.9 |
| Solids (2 g, 2 h at 120° C.), % | 52.38 |
| Viscosity, cP | 115 |
| pH | 7.85 |
| WT | >1/9 |
| Gel time 100° C., min | 88 |

In Table 2 MR stands for molecular ratio, i.e. the ratio of
mol(paraformaldehyde)/mol(phenol+lignin). In Table 2 WT
stands for water tolerance, i.e. describes now much water
can be added to resin before resin starts to precipitate.

The gel time was determined as above described for
example 1.

From the results indicated in Table 2 it can be seen that the
solids content is on a suitable level for the binder compo-
sition to be used for high-pressure laminates. The water
tolerance is better than for traditionally used phenol-form-
aldehyde binder compositions used for laminates.

Example 3

Producing High-Pressure Laminate

High-pressure laminate was produced by fusing together
under heating and pressure several layers of Kraft paper impregnated with the binder composition as produced in Example 1. The formed laminates were thereafter tested for boiling water and heat tolerance. The tests were performed according to standard SFS-EN 438-2 (high-pressure decorative laminates (HPL)). The samples were evaluated for delamination and blisters. Both tests were based on the evaluation of a visual appearance after immersion for 2 hours in boiling water and after heating for 30 minutes in oven at 150° C. The binder compositions in which 40 and 50% of phenol was replaced with lignin, the heat and boiling water and heat tolerances were good and no blisters were observed.

Example 4

Activating Lignin and the Use of Activated Lignin for the Production of a Binder Composition In this example lignin was firstly treated with phenol and sodium hydroxide. The following components and their amounts were used:

| Material | MW | Concentration | Mass, g |
|---|---|---|---|
| NaOH | 40 | 50% | 266 |
| Water | 18 | 0% | 500 |
| Lignin | 180 | 68.5% | 602 |
| Phenol | 94 | 90% | 458 |

Firstly lignin was mixed with water and then sodium hydroxide was added to the formed composition. The pH was increased to a value of about 13.8. To this composition, the phenol was added. The temperature of the composition was kept under 45° C. while dissolving lignin into the composition.

Then the temperature was increased to about 75° C. and the heating was continued for about 1 h. The pH of the composition was kept at a value of 10-11 during the heating of the composition.

Lignin treated as above described was thereafter used for producing a binder composition. 490 g of paraformaldehyde was added to the above formed composition in a stepwise manner. The formed composition was heated at a temperature of about 83-85° C. and until the viscosity increased to 315 cP as measured at 25° C. using a rotary viscometer.

The formed binder composition was thereafter analyzed. The results of the analysis can be seen in Table 3.

TABLE 3

| Analysis results | |
|---|---|
| Specifications | |
| MR | 1.9 |
| Solids (2 g, 2 h at 120° C.), % | 42.3 |
| Viscosity, cP | 315 |
| pH | 12.1 |
| Gel time 100° C., min | 48 |

In Table 3 MR stands for molecular ratio, i.e. the ratio of mol(paraformaldehyde)/mol(phenol+lignin).

The gel time was determined as above described for example 1.

From the results indicated in Table 3 it can be seen that the properties of the formed binder composition are suitable for wood adhesives and to be used e.g. in plywood and oriented strand boards.

14

Example 5

Activating Lignin and the Use of Activated Lignin for the Production of a Binder Composition In this example lignin was firstly treated with phenol. The following components and their amounts were used:

| Material | MW | Concentration | Mass, g |
|---|---|---|---|
| Water | 18 | 0% | 584.6 |
| Lignin | 180 | 70% | 708.0 |
| Phenol | 94 | 90% | 551.0 |

Firstly a composition of water and phenol was formed. Then lignin was slowly added to the composition with agitation while keeping the temperature of the composition below 40° C. and the pH of the composition below a value of 6. When all of the lignin had been added, the composition was heated up to a temperature of 90° C. The pH of the composition was kept at a value of about 7.

Lignin treated as above described was thereafter used for producing a binder composition. 458.4 g of paraformaldehyde was added to the above formed composition in a stepwise manner. Also catalyst, i.e. 52.3 g of sodium hydroxide, was added to the composition in a stepwise manner. The pH of the composition was kept at a value of 7-8. The formed composition was heated at a temperature of 80-90° C. The heating was of the composition was carried out for a total of about 1 hour.

The formed binder composition was thereafter analyzed. The results of the analysis can be seen in Table 4.

TABLE 4

| Analysis results | |
|---|---|
| Specifications | |
| MR | 1.9 |
| Solids (2 g, 2 h at 120° C.), % | 52.1 |
| Viscosity, cP | 135 |
| pH | 7.31 |
| WT | >1/10 |
| Gel time 100° C., min | 85 |

In Table 4 stands for molecular ratio, i.e. the ratio of mol(paraformaldehyde)/mol(phenol+lignin). In Table 4 WT stands for water tolerance, i.e. describes how much water can be added to resin before resin starts to precipitate.

The gel time was determined as above described for example 1.

From the results indicated in Table 4 it can be seen that the solids content is on a suitable level for the binder composition to be used in impregnation applications such as laminates and shuttering films. The water tolerance is better than for traditionally used phenol-formaldehyde binder compositions used for laminates.

Example 6

Treating Lignin and the Use of Activated Lignin for the Production of a Binder Composition In this example lignin was firstly treated with phenol and sodium hydroxide. The following components and their amounts were used:

| Material | MW | Concentration | Mass, g |
|----------|-----|---------------|---------|
| NaOH | 40 | 50% | 66.0 |
| Water | 18 | 0% | 250.0 |
| Lignin | 180 | 70% | 879.0 |
| Phenol | 94 | 90% | 684.0 |

| Material | MW | Concentration | Mass, g |
|----------|-----|---------------|---------|
| NaOH | 40 | 50% | 111.7 |
| Water | 18 | 0% | 227.2 |
| Lignin | 180 | 70% | 171.9 |
| Phenol | 94 | 90% | 534.5 |

Firstly a composition of water and phenol was formed. Then lignin was slowly added to the composition with agitation while keeping the temperature of the composition at about 40° C. and the pH of the composition below a value of 5.5.

When all of the lignin had been added, sodium hydroxide was added to the composition while keeping the temperature of the composition at about 70-75° C. The pH of the composition was kept at a value of below 8.5. Heating of the composition was then continued for 10 minutes at the temperature of 90° C.

Lignin treated as above described was thereafter used for producing a binder composition. 568 g of paraformaldehyde was added to the above formed composition in a stepwise manner. Thereafter the pH of the composition was measured to have a value of about 8. The formed composition was heated at a temperature of about 76° C. and the heating was continued for 1 hour and 45 minutes, during which time the viscosity increased to 930 cP as measured at 25° C. using a rotary viscometer.

The formed binder composition was thereafter analyzed. The results of the analysis can be seen in Table 5.

TABLE 5

| Analysis results | |
|---|---|
| Specifications | |
| MR | 1.9 |
| Solids (2 g, 2 h at 120° C.), % | 65.1 |
| Viscosity, cP | 780 |
| pH | 7.62 |
| WT | >1/10 |
| Gel time 130° C., min | 8 |

In Table 5 MR stands for molecular ratio, i.e. the ratio of mol(paraformaldehyde)/mol(phenol+lignin). In Table 5 WT stands for water tolerance, i.e. describes how much water can be added to resin before resin starts to precipitate.

The gel time was determined as above described for example 1 but using a temperature of 130° C.

The binder composition formed was used for preparing a pre-preg by adding about 2 weight-%, based on the weight of the binder composition, of diethylene glycol (DEG) and then below 1 weight-%, based on the weight of binder composition, of glycolic acid to the cooled binder composition.

Example 7

Formation of Rock Wool

In this example lignin was firstly treated with phenol and sodium hydroxide. The following components and their amounts were used:

Firstly lignin was added to a composition of water and phenol. To this composition 45.4 g of borax was added in a stepwise manner. Borax is a commonly used product in rock wool to enhance fire resistance and to act as an anti-moulding agent. Borax does not take part in the reactions where lignin is dissolved and allowed to react with phenol and NaOH. Borax can be added to the composition in the beginning of the process to ensure even distribution in the polymer matrix but it could also be added only after the binder composition formation. After the borax had been added, sodium hydroxide was added to the composition. The temperature of the composition was about 20-42° C. when dissolving lignin into this composition.

Thereafter the temperature was increased to about 65° C. for allowing lignin to react with phenol and sodium hydroxide for about 1 our while keeping the pH of the composition at about 10.

After the lignin had been activated by the above procedure, 1093.5 g of formaldehyde was added to the composition and the composition was heated at a temperature of 65° C. for about 2.5 hours. The pH was kept at about 8.8. Then the composition was cooled to a temperature of 40° C., and about 1 weight-%, based on the weight of the composition, of boric acid was added followed by adding about 4-5 weight-%, based on the weight of the composition, of urea.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for producing a binder composition, the method comprising:
   mixing lignin with water, an alkali, and a compound selected from a class of phenols to form a first composition such that the lignin in the first composition is substantially dissolved;
   allowing the dissolved lignin in the first composition to react at a temperature of 60-100° C. with the compound selected from the class of phenols and the alkali in the first composition; and
   adding a crosslinking agent to the first composition to form a second composition, the crosslinking agent substantially reacting with both the compound selected from the class of phenols and the lignin,
   wherein a concentration of the lignin in the first composition is 10-40 weight-% based on a total weight of the first composition, and
   wherein a concentration of the alkali in the first composition is 0.1-15 weight-% based on the total weight of the first composition.

2. The method of claim 1, wherein the concentration of the alkali in the first composition is 6-10 weight-% based on the total weight of the first composition, and the concentration of the lignin in the first composition is 20-30 weight-% based on the total weight of the first composition.

3. The method of claim 1, wherein a concentration of the compound selected from the class of phenols in the first composition is 20-50 weight-% based on the total weight of the first composition.

4. The method of claim 1, further comprising adding urea to the second composition.

5. The method of claim 1, wherein the alkali is sodium hydroxide.

6. The method of claim 1, wherein the compound selected from the class of phenols is phenol.

7. The method of claim 1, further comprising maintaining a temperature of 0-60° C. while mixing the lignin with the water, the alkali, and the compound selected from the class of phenols, and maintaining a temperature of 60-100° C. while adding the crosslinking agent to the first composition to increase a viscosity of the second composition.

8. The method of claim 7, wherein the viscosity of the second composition is at least 500 cP but not more than 1500 cP.

9. The method of claim 1, wherein the crosslinking agent is formaldehyde.

10. The method of claim 1, wherein the act of allowing the lignin to react in the first composition includes allowing the lignin to react with the alkali to form alkalated lignin.

11. A binder composition comprising:
    a first part including dissolved lignin, water, an alkali, and a compound selected from a class of phenols, wherein the dissolved lignin in the first part is reacted at a temperature of 60-100° C. with the compound selected from the class of phenols and the alkali; and
    a second part reacted with the first part, the second part including a crosslinking agent, wherein the cross-link-ing agent is reacted with both the compound selected from the class of phenols and the alkali,
    wherein a concentration of the lignin in the first part is 10-40 weight-% based on a total weight of the first part, and
    wherein a concentration of the alkali in the first part is 0.1-15 weight-% based on the total weight of the first part.

12. The binder composition of claim 11, wherein the concentration of the alkali in the first part is 6-10 weight-% based on the total weight of the first part, and the concentration of the lignin in the first part is 20-30 weight-% based on the total weight of the first part.

13. The binder composition of claim 11, wherein a concentration of the compound selected from the class of phenols in the first part is 20-50 weight-% based on the total weight of the first part.

14. The binder composition of claim 11, further comprising urea.

15. The binder composition of claim 11, wherein the alkali is sodium hydroxide.

16. The binder composition of claim 11, wherein the compound selected from the class of phenols is phenol.

17. The binder composition of claim 11, wherein a viscosity of the binder composition is at least 500 cP but not more than 1500 cP.

18. The binder composition of claim 11, wherein the crosslinking agent is formaldehyde.

19. A method for producing a binder composition, the method comprising:
    mixing lignin with water, an alkali, and a compound selected from a class of phenols to form a first com-position such that the lignin in the first composition is substantially dissolved;
    allowing the dissolved lignin to react at a temperature of 60-100° C. with the alkali and the compound selected from the class of phenols in the first composition; and
    adding a crosslinking agent to the first composition to form a second composition, the crosslinking agent being reacted with both the phenol and the lignin,
    wherein a weight ratio of the lignin to the alkali in the first composition is from 40:60 to 99.8:0.2.

20. The method of claim 19, wherein the weight ratio of the lignin to the alkali in the first composition is from 66.7:33.3 to 83.3:17.7.

21. The method of claim 20, wherein a weight ratio of the lignin to the compound selected from the class of phenols in the first composition is from 16.7:83.3 to 66.7:33.3.

22. The method of claim 19, wherein the alkali is a hydroxide of an alkali metal.

23. The method of claim 19, wherein the compound selected from the class of phenols is selected from a group consisting of phenol, cresol, resorcinol, and combinations thereof, and the crosslinking agent is formaldehyde.

24. The method of claim 19, further comprising main-taining a temperature of 0-60° C. while mixing the lignin with the water, the alkali, and the compound selected from the class of phenols, and maintaining a temperature of 60-100° C. while adding the crosslinking agent to the first composition to increase a viscosity of the second composi-tion.

25. The method of claim 19, wherein the lignin is kraft lignin.

26. A binder composition formed from an aqueous com-position, the aqueous composition comprising:
    lignin;
    an alkali;
    a crosslinking agent;
    a compound selected from a class of phenols; and
    water,
    wherein a weight ratio of the lignin to the alkali in the aqueous composition is from 40:60 to 99.8:0.2.

27. The binder composition of claim 26, wherein the weight ratio of the lignin to the alkali in the aqueous composition is from 66.7:33.3 to 83.3:17.7.

28. The binder composition of claim 26, wherein a weight ratio of the lignin to the compound selected from the class of phenols is from 16.7:83.3 to 66.7:33.3.

29. The binder composition of claim 26, wherein the alkali is a hydroxide of an alkali metal.

30. The binder composition of claim 26, wherein the compound selected from the class of phenols is selected from a group consisting of phenol, cresol, resorcinol, and combinations thereof, and the crosslinking agent is formal-dehyde.

31. The binder composition of claim 26, wherein the lignin is kraft lignin.

\*　\*　\*　\*　\*